US012782543B2

(12) United States Patent
Henry et al.

(10) Patent No.: US 12,782,543 B2
(45) Date of Patent: Nov. 3, 2026

(54) EXTENDING RANGE OF ULTRA-WIDE BAND (UWB)-BASED DEVICE-TO-DEVICE RANGING

(71) Applicant: Cisco Technology, Inc., San Jose, CA (US)

(72) Inventors: Jerome Henry, Pittsboro, NC (US); Matthew A. Silverman, Shaker Heights, OH (US); Robert C. Badea, Broadview Heights, OH (US); Ardalan Alizadeh, Campbell, CA (US); Peiman Amini, Fremont, CA (US); Robert E. Barton, Richmond (CA); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 18/431,768

(22) Filed: Feb. 2, 2024

(65) Prior Publication Data

US 2025/0251507 A1 Aug. 7, 2025

(51) Int. Cl.
*G01S 13/76* (2006.01)

(52) U.S. Cl.
CPC .................................... *G01S 13/76* (2013.01)

(58) Field of Classification Search
CPC .......... H04L 67/52; H04L 69/18; H04W 4/02; H04W 4/80; G01S 13/76; G01S 5/0081; G01S 5/0236; G01S 7/006; G01S 13/003; G01S 13/765
See application file for complete search history.

(56) References Cited

U.S. PATENT DOCUMENTS

| | | | | |
|---|---|---|---|---|
| 11,703,585 B2 * | 7/2023 | Padaki | G01S 7/006 | 342/125 |
| 12,160,829 B2 * | 12/2024 | Al Jurdi | H04W 52/0216 | |
| 2021/0136556 A1 * | 5/2021 | Lee | H04L 1/08 | |
| 2022/0066010 A1 * | 3/2022 | Henry | H04W 76/15 | |
| 2022/0397658 A1 * | 12/2022 | Ha | G01S 13/0209 | |
| 2022/0397659 A1 * | 12/2022 | Ha | H04W 4/80 | |
| 2023/0019120 A1 * | 1/2023 | Koo | G01S 5/10 | |

(Continued)

FOREIGN PATENT DOCUMENTS

| | | | |
|---|---|---|---|
| EP | 4346237 A1 | 4/2024 | |
| KR | 20220170152 A * | 12/2022 | G01S 13/765 |

(Continued)

OTHER PUBLICATIONS

International Search Report and Written Opinion for International Application No. PCT/US2025/014324, mailed Jul. 7, 2025, 18 Pages.

(Continued)

*Primary Examiner* — Peter M Bythrow
(74) *Attorney, Agent, or Firm* — Patterson + Sheridan, LLP

(57) ABSTRACT

Techniques and apparatus for extending a range of a ranging procedure performed using ultra-wide band (UWB) are described. An example technique includes receiving, by a first network entity, control information for a ranging procedure via a non-ultra-wide band (non-UWB) communication protocol. The ranging procedure is performed by the first network entity with a second network entity based on the control information and via an ultra-wide band (UWB) communication protocol.

18 Claims, 7 Drawing Sheets

(56) References Cited

U.S. PATENT DOCUMENTS

| | | | | |
|---|---|---|---|---|
| 2023/0170933 | A1* | 6/2023 | Lee | G01S 13/765 375/130 |
| 2024/0106495 | A1* | 3/2024 | Verma | H04W 76/14 |
| 2025/0035770 | A1* | 1/2025 | Pakrooh | H04B 1/71635 |
| 2025/0039827 | A1* | 1/2025 | Reddy | H04J 3/0661 |
| 2025/0039828 | A1* | 1/2025 | Manolakos | H04W 8/22 |
| 2025/0189649 | A1* | 6/2025 | Koo | G01S 13/0209 |
| 2025/0254644 | A1* | 8/2025 | Reddy | H04B 1/7075 |

FOREIGN PATENT DOCUMENTS

| | | | |
|---|---|---|---|
| WO | 2022169619 | A1 | 8/2022 |
| WO | 2022178399 | A1 | 8/2022 |
| WO | 2023164379 | A1 | 8/2023 |

OTHER PUBLICATIONS

Partial International Search Report for International Application No. PCT/US2025/014324, mailed May 14, 2025, 13 Pages.

* cited by examiner

EXTENDING RANGE OF ULTRA-WIDE BAND (UWB)-BASED DEVICE-TO-DEVICE RANGING

TECHNICAL FIELD

Embodiments presented in this disclosure generally relate to wireless communications. More specifically, embodiments disclosed herein relate to access point to access point ranging with ultra-wideband (UWB) communications.

BACKGROUND

UWB can enable precise real-time measurement of location and distance. UWB can be used to provide client location and/or ranging services with considerably high accuracy (e.g., to within 10 centimeters (cm) in line of sight (LoS) cases, and within 50 cm in non-LoS (NLOS) cases). UWB is defined by the FiRa Consortium, among other organizations. The FiRa technical specifications are based on High-Rate Pulse Repetition frequency (HRP) portion of the IEEE 802.15.4-2015 technical specification. Generally, client ranging is performed based on time of flight measurements, which can be performed in two primary ways: two way ranging (TWR) and time difference of arrival (TDoA).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
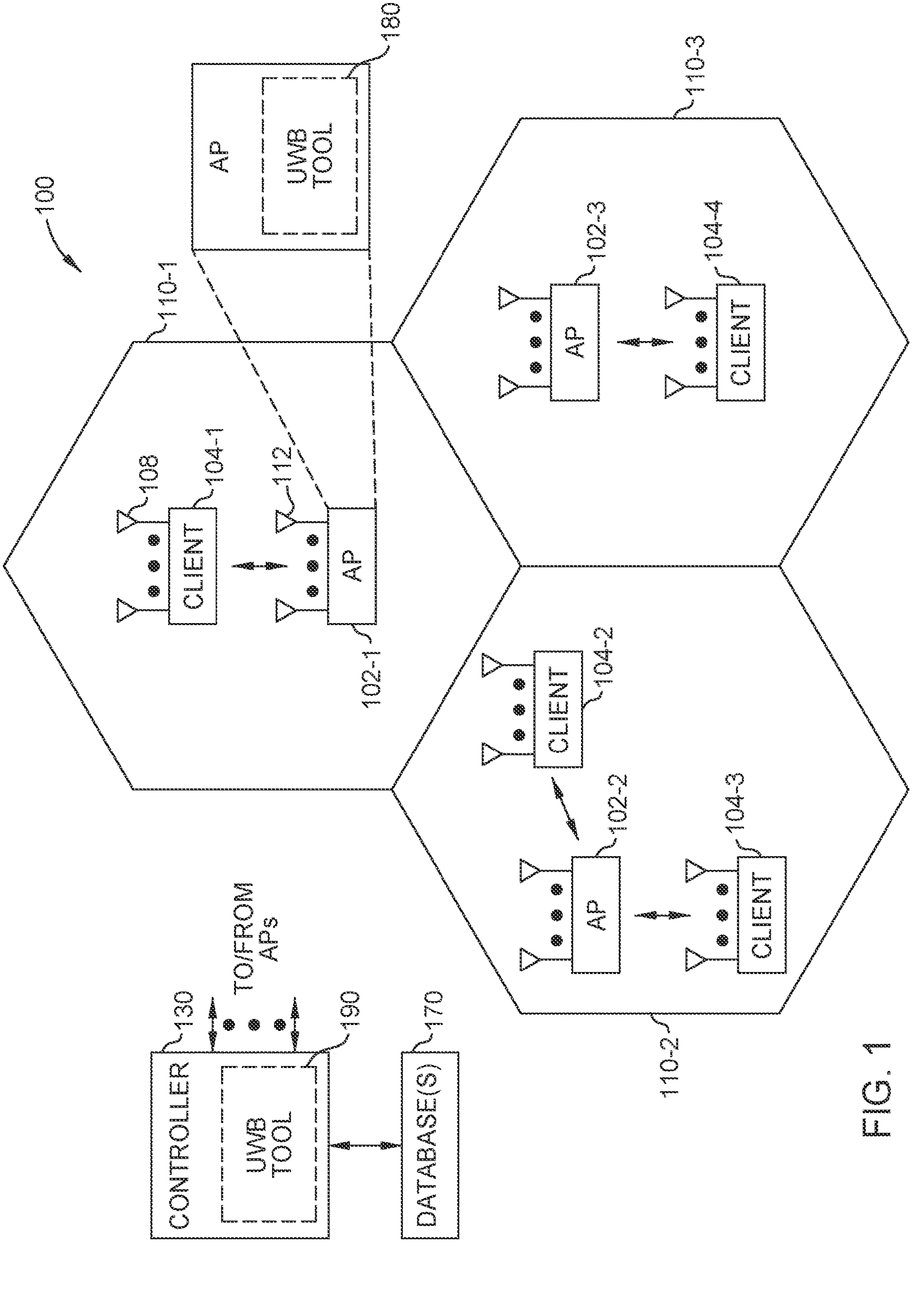
FIG. 1 illustrates an example system, according to one embodiment.

One embodiment described herein is a computer-implemented method. The computer-implemented method includes receiving, by a first network entity, control information for a ranging procedure via a non-ultra-wide band (non-UWB) communication protocol. The computer-implemented method also includes performing, by the first network entity, the ranging procedure with a second network entity based on the control information and via an ultra-wide band (UWB) communication protocol, wherein performing the ranging procedure comprises exchanging solely ranging messages with the second network entity.

Another embodiment described herein is a first network device. The first network device includes one or more memories collectively storing instructions, and one or more processors communicatively coupled to the one or more memories. The one or more processors are collectively configured to execute the instructions to cause the first network device to perform an operation. The operation includes receiving control information for a ranging procedure via a non-ultra-wide band (non-UWB) communication protocol; and performing the ranging procedure with a second network device based on the control information and using an ultra-wide band (UWB) communication protocol, wherein performing the ranging procedure comprises exchanging solely ranging messages with the second network device.

Another embodiment described herein is a computer-implemented method. The computer-implemented method includes generating control information for a ranging procedure between a first network entity and a second network entity. The computer-implemented method also includes transmitting the control information to at least one of the first network entity or the second network entity via a non-ultra-wide band (non-UWB) communication protocol. The computer-implemented method also includes receiving, via a non-UWB communication protocol, a first ranging report associated with the ranging procedure from the first network entity and a second ranging report associated with the ranging procedure from the second network entity. The computer-implemented method further includes determining a distance between the first network entity and the second network entity based on the first and second ranging reports.

EXAMPLE EMBODIMENTS

In certain environments, various devices may use UWB-based techniques to perform positioning (e.g., indoor positioning) for various use cases, such as indoor navigation and location tracking, as illustrative, non-limiting examples. For example, with UWB, devices can transmit data across short distances and precisely determine location by measuring how long it takes for a radio pulse to travel between devices. The spectrum of a UWB packet may extend across 500 megahertz (MHZ) of bandwidth, and the UWB packet may include sequences of short duration pulses (e.g., 2 nanosecond (ns) pulses). The short duration pulses and high bandwidth associated with UWB signals may allow UWB devices to precisely keep track of signal transmission times, reception times, and reply times. This, in turn, may allow for precise real-time measurement of location and distance (e.g., within 10 cm in LOS cases and within 50 cm in NLOS cases).

Consider, for example, a UWB double-sided two-way ranging (DS-TWR) protocol/procedure between an initiator (e.g., first UWB device) and a responder (e.g., second UWB device) in which the initiator and responder pass UWB signals back and forth, keeping tracking of signal transmission times, reception times, and reply times, in order to determine the precise distance between themselves. The initiator may be a UWB tag and the responder may be a UWB anchor. In some cases, the UWB tag may be included within an access point (AP) or a non-AP device (e.g., smartphone, laptop, smartwatch, or other wireless device). In some cases, the UWB anchor may be included within an AP or non-AP device. The DS-TWR procedure may involve the exchange of control messages (or frames or packets) (e.g., scrambled timestamp sequence (STS) packet configuration option 0 (SP0) frames), which include data, and ranging messages (or frames or packets) (e.g., STS packet configuration option 3 (SP3) frames), which do not include data. The control messages may be used to configure the exchange of the ranging messages. For example, the control messages may include parameters, such as destination address (e.g., responder UWB address), vendor organizationally unique identifier (OUI), UWB session identifier (ID), STS round index, device management list, and boolean_data type (or bool) suspend ranging indication, as illustrative, non-limiting examples.

One potential drawback to UWB-based positioning is that UWB-based positioning may have a relatively short range compared to other positioning technologies (e.g., WiFi, Bluetooth, etc.). In the conventional DS-TWR protocol, for example, the control messages may have a shorter range than the ranging messages. Thus, while the ranging messages in the DS-TWR protocol may potentially allow for an extended range, the range of the DS-TWR protocol may be limited by the control messages, since the ranging messages may rely on the configuration parameters conveyed via the control messages. Accordingly, while UWB-based positioning may offer better accuracy compared to other positioning technologies, the use of UWB-based positioning may be limited to use cases and/or environments in which devices are in relatively close proximity to each other.

Certain embodiments described herein provide techniques for increasing the range of UWB exchanges in UWB-based positioning. In certain embodiments, the techniques described herein can be used to extend the range of UWB ranging protocols, such as DS-TWR protocols. For example, certain embodiments may allow for performing UWB-based AP-to-AP ranging, where the UWB communication exchange includes solely ranging messages, as opposed to control messages and ranging messages. In certain embodiments described below, the control messages may be communicated using an out-of-band (OOB) communication protocol (or non-UWB communication protocol), such as an 802.11 communication protocol (or WiFi), Bluetooth, Ethernet, or cellular communications, as illustrative, non-limiting examples. By enabling devices to perform UWB ranging with solely ranging messages, embodiments can significantly improve the range of the communication link between the initiator and responder of the UWB-based ranging procedure.

Note, the techniques described herein for performing UWB-based AP-to-AP ranging may be incorporated into (such as implemented within or performed by) a variety of wired or wireless apparatuses (such as nodes). In some implementations, a node includes a wireless node. Such wireless nodes may provide, for example, connectivity to or from a network (such as a wide area network (WAN) such as the Internet or a cellular network) via a wired or wireless communication link. In some implementations, a wireless node may include an AP or a controller.

FIG. 1 illustrates an example system 100 in which one or more techniques described herein can be implemented, according to one embodiment. As shown, the system 100 includes, without limitation, one or more APs (e.g., AP 102-1, AP 102-2, and AP 102-3), one or more client STAs (e.g., client STA 104-1, client STA 104-2, client STA 104-3, and client STA 104-4), a controller 130, and one or more databases 170.

An AP is generally a fixed station that communicates with client STA(s) and may be referred to as a base station, wireless device, or some other terminology. A client STA may be fixed or mobile and also may be referred to as a mobile STA, a client, a STA, a wireless device, or some other terminology. Note that while a certain number of APs and client STAs are depicted, the system 100 may include any number of APs and client STAs.

As used herein, an AP along with the STAs associated with the AP (e.g., within the coverage area (or cell) of the AP) may be referred to as a basic service set (BSS). Here, AP 102-1 is the serving AP for client STA 104-1, AP 102-2 is the serving AP for client STAs 104-2 and 104-3, and AP 102-3 is the serving AP for client STA 104-4. The AP 102-1, AP 102-2, and AP 102-3 are neighboring (peer) APs. The APs 102 may communicate with one or more client STAs 104 on the downlink and uplink. The downlink (e.g., forward link) is the communication link from the AP 102 to the client STA(s) 104, and the uplink (e.g., reverse link) is the communication link from the client STA(s) 104 to the AP 102. In some cases, a client STA may also communicate peer-to-peer with another client STA.

As shown in FIG. 1, each client STA 104 includes one or more radios 108. The client STA 104 can use one or more of the radios 108 to form links with an AP 102. As also shown, each AP 102 includes one or more radios 112 that the AP 102 can use to form links with one or more client STAs 104 and/or one or more APs 102. In general, the AP(s) 102 and the client STA(s) 104 may form any suitable number of links for communication using any suitable frequencies and using any suitable communication protocols. In some instances, a client STA 104 may form multiple links with a single AP 102. In some cases, the AP 102 may use at least one radio 112 to communicate with at least one radio 112 of another AP 102 using a UWB communication protocol. For example, the respective radios 112 of the APs may be UWB radios. The APs may use their respective UWB radios to exchange UWB signals with each other, e.g., according to the UWB communication protocol. Additionally, in some cases, the AP 102 may use at least one radio 112 to communicate with at least one radio 112 of another AP 102 and/or a controller 130 using a non-UWB communication protocol, such as WiFi, Bluetooth, cellular, etc.

In certain embodiments, the APs 102 may be controlled or managed at least partially by the controller 130. Here, the controller 130 couples to and provides coordination and control for the APs 102 1-3. For example, the controller 130 may handle adjustments to RF power, channels, authentication, and security for the APs. The controller 130 may also coordinate the links formed by the client STA(s) 104 with the APs 102. The controller 130 and APs 102 may utilize a same control plane protocol.

The operations of the controller 130 may be implemented by any device or system, and may be combined or distributed across any number of systems. For example, the controller 130 may be a WLAN controller for the deployment of APs 102 within the system 100. In some examples, the controller 130 is included within or integrated with an AP 102 and coordinates the links formed by that AP 102 (or otherwise provides control for that AP). For example, each AP 102 may include a controller that provides control for that AP. In some examples, the controller 130 is separate from the APs 102 and provides control for those APs. In FIG. 1, for example, the controller 130 may communicate with the APs 102 1-3 via a (wired or wireless) backhaul. The APs 102 1-3 may also communicate with one another, e.g., directly or indirectly via a wireless or wireline backhaul. Example hardware that may be included in an AP 102 or a controller 130 is discussed in greater detail with regard to FIG. 8.

The database(s) 170 are representative of storage systems that may include historical and/or real-time AP telemetry data associated with one or more AP deployments, AP topological information (e.g., AP positions, positions/arrangements of interfering physical structures, such as walls) associated with one or more AP layouts, radio resource configurations (e.g., AP maximum transmit powers), radio resource management (RRM) information, UWB parameters, time-of-flight (ToF) information (e.g., signal transmission times, reception times, and reply times), distance information (e.g., AP-to-AP distances), or a combination thereof.

In certain cases, one or more devices depicted in FIG. 1 may perform one or more UWB positioning techniques to determine precise measurements of location and/or distance. As a reference example, a first AP (e.g., AP 102-1) may perform ranging with a second AP (e.g., AP 102-2) using a UWB communication protocol (referred to herein as AP-to-AP ranging). In certain cases, AP-to-AP ranging may be implemented as part of self-locating functionality of an AP (also referred to a self-location function). That is, AP-to-AP ranging may be performed to allow an AP to automatically determine its location within an environment, e.g., based on capturing an accurate distance resolution between two APs via the AP-to-AP ranging.

Figure 2:
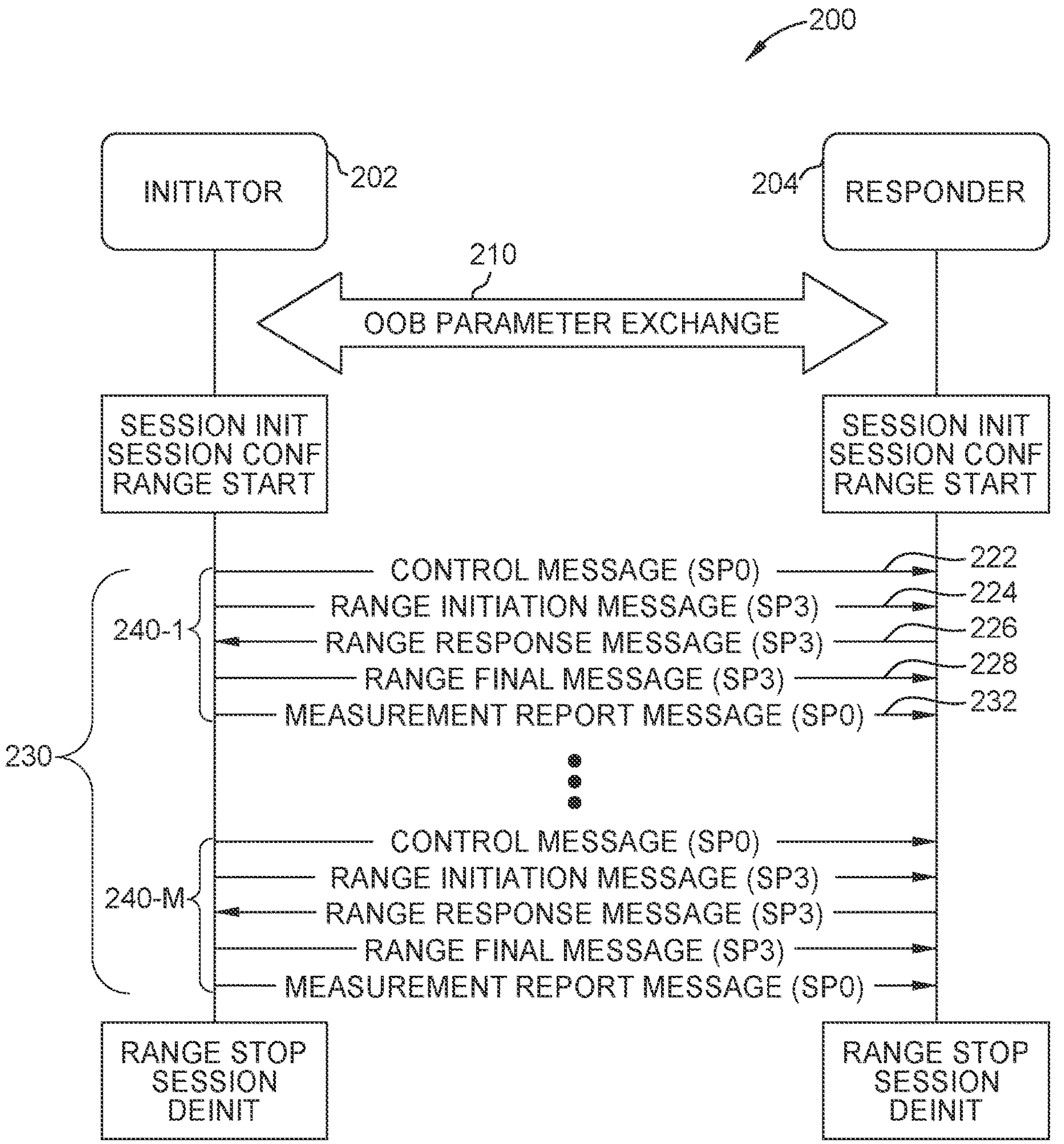
FIG. 2 illustrates an example double-sided two-way ranging procedure.

In certain instances, AP-to-AP ranging may be implemented using a UWB-based DS-TWR procedure. FIG. 2 illustrates an example UWB-based DS-TWR procedure 200 between an initiator 202 and a responder 204. In some cases, the initiator 202 may be an AP (e.g., AP 102-1) and the responder 204 may be another AP (e.g., AP 102-2).

As indicated at 210, the initiator 202 and responder 204 may participate in an OOB parameter exchange prior to ranging. For example, the initiator 202 and responder 204 may coordinate and/or exchange one or more parameters associated with a ranging session, such as a ranging session ID. The parameters may be exchanged via an OOB connection between the initiator 202 and responder 204. The OOB connection may be a WiFi connection, Bluetooth connection (e.g., Bluetooth Low Energy (BLE) connection), Ethernet connection, or cellular connection (e.g., 4G (LTE) or 5G), as illustrative, non-limiting examples.

After participating in the OOB parameter exchange, the initiator 202 and responder 204 may initiate a ranging session 230 based on the ranging session ID. The ranging session 230 may include one or more ranging blocks 240-1 to 240-M. Each ranging block 240 may include an exchange of a control message 222, a range initiation message 224, a range response message 226, a range final message 228, and a measurement report message 232 between the initiator 202 and responder 204.

In particular, the initiator 202 (e.g., the device assigned the role of initiator) may begin each ranging block 240 with the transmission of a control message 222 to the responder 204. After transmission of the control message 222, the initiator 202 and responder 204 may exchange one or more ranging messages. As illustrated in FIG. 2, for example, three ranging messages (e.g., range initiation message 224, range response message 226, and range final message 228) are exchanged between the initiator 202 and responder 204, allowing both ends to independently calculate ToF and correct for differences in each other's clock skews for precise ToF estimation. After the ranging messages have been exchanged, a measurement report message 232 (including an estimate of the distance between the initiator 202 and responder 204) may be transmitted.

While FIG. 2 depicts a measurement report message 232 being transmitted from the initiator 202 to the responder 204, note that a measurement report message may be sent by the initiator 202, by the responder 204, or by both the initiator 202 and the responder 204. For example, the responder 204 may receive a first measurement report message from the initiator 202 where the first measurement report message includes a distance estimate measured by the initiator 202, and the responder 204 may transmit a second measurement report message to the initiator 202 where the second measurement report message includes a distance estimate measured by the responder 204. The second measurement report message may be sent to confirm the distance estimate in the first measurement report message.

The distance (d) within the measurement report message may be calculated using the following expression in (1):

$$\text{Distance} = ToF * (\text{speed of light}) \tag{1}$$

where ToF (from the perspective of the initiator 202) (e.g., $ToF_{initiator}$) may be calculated using the expression in (2) and ToF (from the perspective of responder 204) (e.g., $ToF_{responder}$) may be calculated using the expression in (3):

$$ToF_{initiator} = \frac{1}{2}(t_{round1} - t_{reply2}) \tag{2}$$

$$ToF_{responder} = \frac{1}{2}(t_{round2} - t_{reply1}) \tag{3}$$

where $t_{round1}$ is the round-trip time associated with range initiation message 224, $t_{reply1}$ is the amount of time it takes to reply to the range initiation message 224, $t_{round2}$ is the round-trip time associated with range response message 226, and $t_{reply2}$ is the amount of time it takes to reply to the range response message 226.

$t_{round1}$ may be calculated using the expression in (4), $t_{reply1}$ may be calculated using the expression in (5), $t_{round2}$ may be calculated using the expression in (6), and $t_{reply2}$ may be calculated using the expression in (7):

$$t_{round1} = (T_3 - T_0) \tag{4}$$

$$t_{reply1} = (T_2 - T_1) \tag{5}$$

$$t_{round2} = (T_5 - T_2) \tag{6}$$

$$t_{reply2} = (T_4 - T_3) \tag{7}$$

where $T_0$ is the timestamp of transmission of the range initiation message 224, $T_1$ is the timestamp of reception of the range initiation message 224, $T_2$ is the timestamp of transmission of the range response message 226, $T_3$ is the timestamp of reception of the range response message 226, $T_4$ is the timestamp of transmission of the range final message, and $T_5$ is the timestamp of reception of the range final message. Note, in cases where the DS-TWR procedure 200 depicted in FIG. 2 uses an SP3 format for the range initiation message 224, the range response message 226, and the range reply message 228, $t_{reply1}$ and $t_{reply2}$ may be set to fixed values known by the initiator 202 and responder 204.

Figure 3:
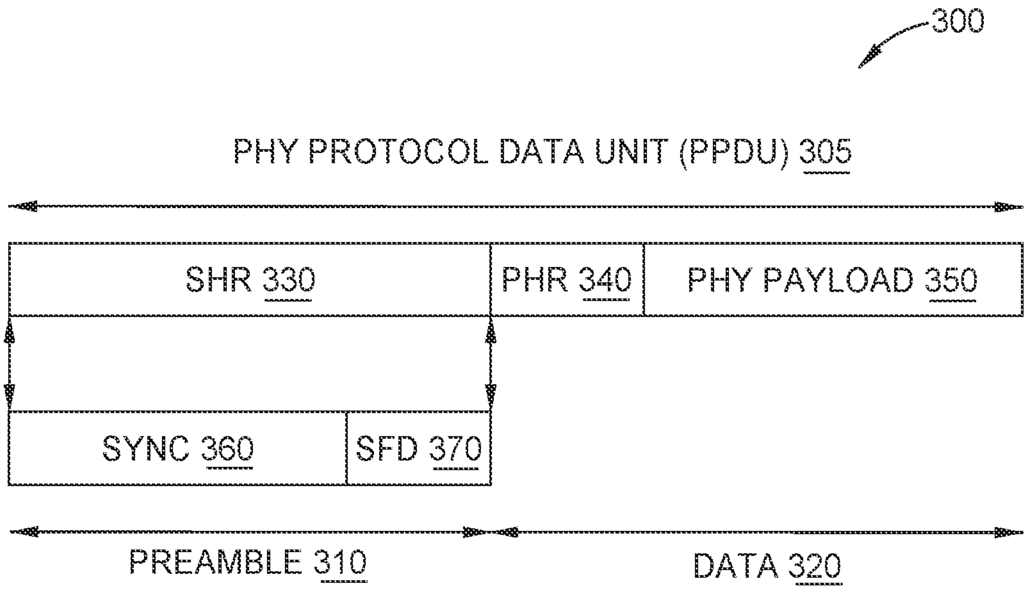
FIG. 3 illustrates an example physical (PHY) protocol data unit frame format used within a ranging procedure.

The control message 222 may include information (e.g., data) for coordinating the exchange of the ranging messages (e.g., range initiation message 224, range response message 226, and range final message 228). The measurement report message 232 may include information (e.g., data) indicating the distance measurement between the initiator 202 and the responder 204. The control message 222 and measurement report message 232 may use an SP0 frame format. FIG. 3 illustrates an example PHY protocol data unit (PPDU) 305 (also referred to as a frame or packet) that uses an SP0 frame format 300. Each of the control message 222 and measurement report message 232 may be transmitted using a PPDU similar to PPDU 305.

As illustrated in FIG. 3, the PPDU 305 includes a preamble portion 310 and a data portion 320. The preamble portion 310 includes a synchronization header (SHR) 330, which includes a synchronization (SYNC) field 360 and a start-of-frame delimiter (SFD) field 370. The SYNC field 360 and SFD field 370 may be training fields for a committed information rate (CIR) and carrier frequency offset correction. The SYNC field 360 may include repetitions of a preamble symbol. The number of repetitions of the preamble symbol may be defined in a wireless communication standard (e.g., IEEE 802.15.4-2015 may support 16, 64, 1024, and 4096 preamble symbol repetitions, IEEE 802.15.4z may support 32 and 64 preamble symbol repetitions). The SFD field 370 may be spread by one or more preamble symbols, where each of the preamble symbols is multiplied by an SFD sequence (e.g., a ternary code sequence such as {−1, 0, 1}). The SFD sequence supported by the SFD field 370 may be defined in a wireless communication standard (e.g., IEEE 802.15-4 and variants thereof).

The data portion 320 of PPDU 305 includes a PHY header (PHR) 340 and a PHY payload 350. The PHR 340 and PHY payload 350 may include symbols that are modulated using a combination of burst position modulation (BPM) and binary phase-shift keying (BPSK). Each symbol may be composed of an active burst of UWB pulses and can carry two bits of information. The PHR 340 and PHY payload 350 may be encoded using a Reed-Solomon systematic block code for front error correction. The IEEE 802.15-4-2020 standard defines the Reed-Solomon encoder as RS6 (K+8, K) where K=ceil (I/6)=55−6 bit symbols.

The PHR 340 may convey information that can be used for decoding the PPDU 305. Such information conveyed by the PHR 340 may include a data rate used to transmit the PHY payload 350, length of the PHY payload field 350, and preamble duration, as illustrative, non-limiting examples. The PHY payload 350 may be sent at the data rate indicated in the PHR 340. In some cases, the PHY payload 350 may include information to aid in over-the-air (OTA) UWB ranging coordination between the initiator 202 and responder 204. Such information conveyed by the PHY payload 350 may include a destination address (responder UWB address), a vendor OUI, a UWB session ID, STS round index, device management list, and a Boolean suspend_ranging indication, as illustrative, non-limiting examples.

Figure 4:
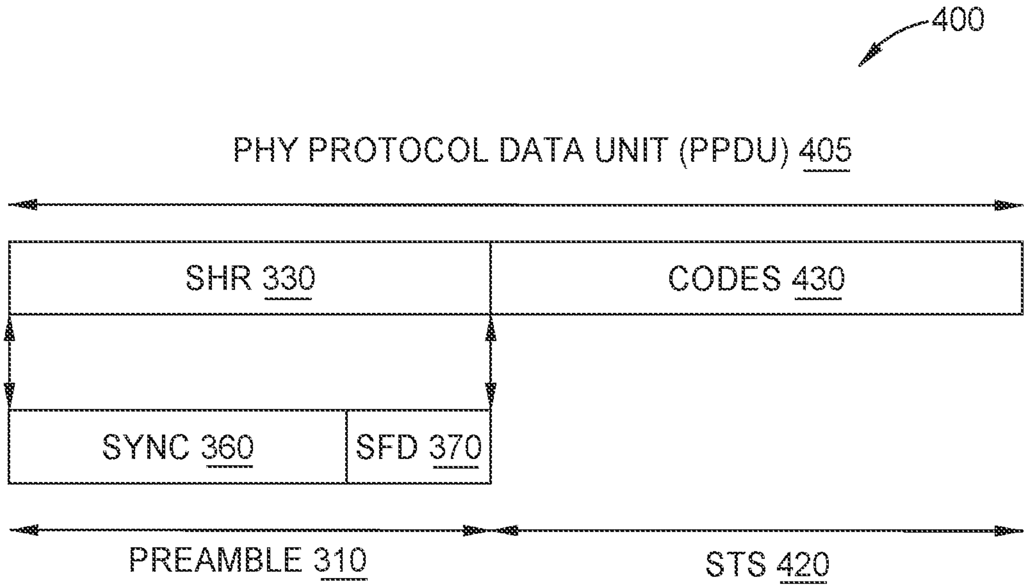
FIG. 4 illustrates another example PHY protocol data unit frame format used within a ranging procedure.

Referring back to FIG. 2, in certain cases, the ranging messages (e.g., range initiation message 224, range response message 226, and range final message 228) may use an SP3 frame format. FIG. 4 illustrates an example PPDU 405 (also referred to as a frame or packet) that uses an SP3 frame format 400. Each of the ranging messages 224, 226, and 228 may be transmitted using a PPDU similar to PPDU 405.

As illustrated in FIG. 4, similar to PPDU 305, the PPDU 405 includes a preamble portion 310, which includes a SYNC field 360 and a SFD field 370. Compared to PPDU 305, the PPDU 405 includes an STS field 420. The STS field 420 may include repetitions of chipping codes 430 (e.g., specified in a standard) and may be encrypted with Advanced Encryption Standard (AES)-128 bit code, which is based on a hash of the session ID and ranging round number. The purpose of the ranging messages (with SP3 frame format 400) is to provide a known and repetitive signal that UWB transceivers (e.g., initiator 202 and responder 204) can correlate to reconstruct high resolution channel impulse responses for accurate ToF measurements. For example, compared to PPDU 305, the PPDU 405 may lack a data portion and include solely training fields (e.g., SYNC field 360, SFD field 370, and STS field 420) that include symbols comprised of chipping codes known to both initiator 202 and responder 204 and repeated multiple times (e.g., upwards of 64 times). Because the PPDU 405 lacks a data portion, the encryption of the STS field 420 may allow UWB transceivers to discard errant ranging packets.

In certain UWB-based ranging procedures (e.g., DS-TWR procedure 200), the ranging messages may have a significantly higher range than the messages containing data. For example, UWB receivers may have a higher sensitivity (e.g., 4-5 decibels (dB) higher sensitivity) to ranging messages (e.g., SP3 frames, such as range initiation message 224, a range response message 226, a range final message 228) than messages containing data (e.g., SP0 frames, such as control message 222 and measurement report message 232). The higher sensitivity may be due in part to the ranging messages being comprised of a repetitive training code that both sides of the communication link are aware of and have their correlators configured to scan for. For example, the processing gain from repeating the training code upwards of 64 times may place the SYNC field 360, SFD field 370, and STS field 420 at a significantly higher link budget relative to the data portion fields (e.g., PHR 340 and PHY payload field 350). The higher sensitivity to the ranging messages may result in the ranging messages having a higher range than the messages containing data.

However, because ranging messages may have a higher range than messages containing data, one issue with UWB-based ranging procedures (e.g., DS-TWR procedure 200) is that the range of the UWB exchanges may be unnecessary limited by using UWB to exchange messages with the SP0 frame format (e.g., control message 222 and measurement report message 232). For example, while ranging with the SP3 format may allow for an extended range, this potential increase in range may not be possible due to the range limitation of the control message, since the exchange of the ranging messages may rely on configuration/coordination information conveyed via the control message, which has a significantly shorter range than the ranging messages.

The range limitation associated with UWB-based ranging procedures may have an impact on the performance and efficiency of certain positioning applications/use cases. For example, certain APs (e.g., APs 102) may include a UWB radio(s) (e.g., radio(s) 112) that have self-locationing functionality (also referred to a self-location function). As part of the self-locationing functionality, the AP may use the UWB radio to perform AP-to-AP ranging (e.g., DS-TWR procedure 200 or similar ranging procedure) to capture an accurate distance resolution between two APs.

Given a set of APs (e.g., N APs) within an environment (e.g., indoor environment), one challenge associated with implementing AP self-locationing involves accurately calculating the distance between a large number of APs that may be ranging between one another. To address this, certain AP self-locationing implementations may populate as much of the AP-to-AP distance matrix (e.g., Euclidian two-dimensional (2D) matrix) associated with the set of APs as possible. For example, certain AP self-locationing implementations may attempt to reduce the N×N dimensional Euclidean feature space into an N×1 space (AP relative coordinates system). However, because certain UWB ranging procedures (e.g., DS-TWR procedure 200) may have a limited range due to the use of control messages being transmitted over UWB, it may not be possible to determine certain AP-to-AP distances when there is a large distance between the APs.

Accordingly, certain embodiments described herein provide techniques and apparatus for increasing the range of UWB exchanges in UWB-based positioning. In certain embodiments, the techniques described herein can be used to extend the range of UWB-based ranging protocols, such as DS-TWR protocols. For example, certain embodiments may allow for performing UWB-based ranging, where the UWB communication exchange includes solely ranging messages (e.g., messages that use the SP3 frame format), as opposed to ranging messages and messages containing data (e.g., messages that use the SP0 frame format). The techniques described herein can increase the message transmission power of UWB by decreasing the overhead included in the message. In certain embodiments, the message overhead may be delegated to another transmission mechanism. For example, messages containing data, such as control messages (e.g., SP0 UWB ranging setup frames) and measurement report messages (e.g., SP0 UWB ranging measurement report frames) may be communicated using an OOB communication protocol (or non-UWB communication protocol), such as WiFi, Bluetooth, Ethernet, or cellular. Note, as used herein, the OOB communication protocol may be any communication protocol that does not involve an UWB radio.

As shown in FIG. 1, in certain embodiments, one or more APs 102 may include a UWB tool 180, which is configured to perform one or more techniques described herein. The UWB tool 180 may include hardware, software, or combinations thereof. As described below, an AP (e.g., AP 102-1) may use its UWB tool 180 to communicate ranging parameters associated with a ranging session to another AP (e.g., AP 102-2) using an OOB communication protocol. The AP 102 may also use the UWB tool 180 to participate in the ranging session (e.g., DS-TWR) with the other AP using solely ranging messages (e.g., SP3 frame format).

Similarly, as shown in FIG. 1, in certain embodiments, the controller 130 may include a UWB tool 190. The UWB tool 190 may include hardware, software, or combinations thereof. As described below, in certain embodiments, the controller 130 may use the UWB tool 190 to coordinate a ranging session between multiple APs that does not involve the use of data containing messages, such as messages that use the SP0 frame format.

Figure 5:
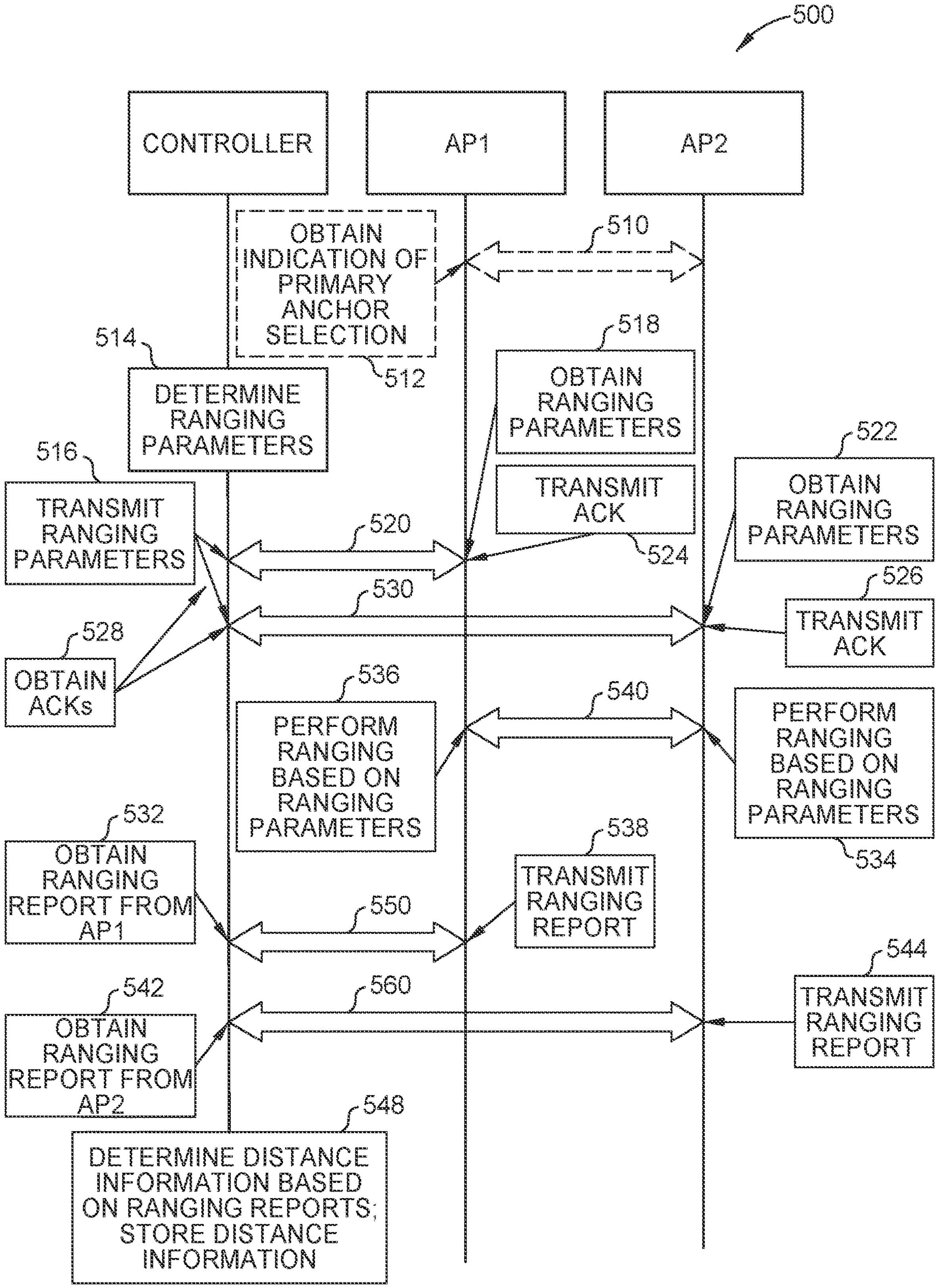
FIG. 5 illustrates a call flow diagram illustrating example signaling between a controller and multiple APs, according to one embodiment.

FIG. 5 depicts a call flow diagram 500 illustrating example signaling between a controller (e.g., controller 130), a first AP (AP1) (e.g., AP 102-1), and a second AP (AP2) (e.g., AP 102-2), according to one embodiment. Although 2 APs are depicted, note that the techniques described herein may be implemented with more than 2 APs. The controller may be configured with UWB tool 190, and AP1 and AP2 may each be configured with a respective UWB tool 180.

In certain embodiments, the controller may assume the role of ranging parameter configurator. The ranging parameter configurator may be configured to communicate ranging parameters (e.g., control information) to be used for UWB-based ranging between devices (e.g., APs 102). Each anchor-hosting device (e.g., AP) may connect and register with the controller via an OOB connection (not shown). The controller (configured as the ranging parameter configurator) may then configure each of the UWB ranging participants with a respective set of ranging parameters.

For example, as indicated at 514, the controller may determine a set of ranging parameters to be used for AP-to-AP ranging. In certain embodiments, the controller may determine a respective set of ranging parameters for each AP. For a given AP X, for example, the ranging parameters may include one or more session IDs, and a list of ranging participants (e.g., AP X+1 to AP X+N) for the AP, an order of ranging exchanges for the AP (e.g., AP X to AP X+1, then AP X to AP X+2, etc.), as illustrative, non-limiting examples.

The controller may transmit each respective set of ranging parameters to the corresponding AP via an OOB connection (e.g., using an OOB communication protocol). For example, as indicated at 516, the controller may transmit ranging parameters associated with AP1 to AP1 via OOB connection 520, and transmit ranging parameters associated with AP2 to AP2 via OOB connection 530.

Each AP that receives a respective set of ranging parameters may generate and transmit an acknowledgement (ACK) indicating successful receipt of the ranging parameters and indicating that the ranging parameters have been successfully configured. As indicated at 518, for example, AP1 may obtain the ranging parameters transmitted via the OOB connection 520 and, as indicated at 524, AP1 may transmit an acknowledgement to the controller via OOB connection 520. Similarly, as indicated at 522, AP2 may obtain the ranging parameters transmitted via the OOB connection 530 and, as indicated at 526, AP2 may transmit an acknowledgment to the controller via OOB connection 530. As indicated at 528, the controller may receive the acknowledgment from AP1 via OOB connection 520 and the acknowledgement from AP2 via OOB connection 530.

Note, in certain embodiments, rather than the controller assuming the role of ranging parameter configurator, one the APs designated as a primary anchor AP may assume the role of ranging parameter configurator. For example, as illustrated in FIG. 5, the APs may discover each other via an OOB connection 510, form a cluster of APs, and then elect one of the APs as a primary anchor. As indicated at 512, for example, AP1 may obtain an indication that it has been selected as the primary anchor. In these embodiments, AP1 may be configured to communicate ranging parameters (e.g., control information) to be used for UWB-based ranging between devices. For example, AP1 may send respective ranging parameters to each AP (e.g., AP2 to APN) and obtain a respective acknowledgment from each AP via one or more OOB connections.

In certain embodiments, once the controller receives an indication (e.g., acknowledgment) that a given AP has received and been configured with the ranging parameters, the controller may determine that the AP has a capability to perform ranging with solely ranging messages (e.g., SP3 frames) and without data containing messages (e.g., SP0 frames). The controller may record an indication of the capability of the AP to perform ranging with solely ranging messages. In some cases, if the controller does not receive an indication that the AP has received the ranging parameters (e.g., there is no response from the AP), then the controller may configure the AP to perform ranging using ranging messages (e.g., SP3 frames) and data containing messages (e.g., SP0 frames).

After obtaining the ranging parameters, each AP may independently schedule one or more ranging sessions with another AP based on the ranging parameters. Each ranging session may be a DS-TWR session with a series of ranging blocks that each includes an exchange of solely ranging messages. In one reference example, the initiator AP (e.g., host AP) may schedule M measurements to be completed over the M series of ranging blocks (e.g., one measurement for each ranging block), where each session is initiated according to the previously scheduled host system time. The host may be responsible for starting and stopping the schedules to ensure that the STS index remains correct.

As indicated at 536, for example, AP1 and AP2 may perform ranging with each other via a UWB connection 540 (e.g., using a UWB communication protocol), based on the ranging parameters. As part of ranging: AP1 may send a first ranging message (e.g., SP3 frame) to AP2 using UWB; in response to the first ranging message, AP2 may send a second ranging message (e.g., SP3 frame) to AP1 using UWB; and in response to the second ranging message, AP1 may send a third ranging message (e.g., SP3 frame) to AP2 using UWB. Because the UWB ranging may be performed without the use of a measurement report message (e.g., SP0 frame), AP1 and AP2 may each generate a different ranging report based on the UWB exchange. As indicated at 538, AP1 may generate and transmit a ranging report to the controller via OOB connection 550, and AP2 may generate and transmit a ranging report to the controller via OOB connection 560.

In one embodiment, each ranging report may have the following structure:

```
struct ranging_report {
   std::vector<ranging_results> results;
}
struct ranging_results {
   unit32_t session_id;
   unit16_t partner_address;
   unit8_t ranging_status;
   unit64_t timestamp_tx;
   unit64_t timestamp_rx;
   unit64_t time_reply;
   unit64_t system_time;
   bool was_initiator;
}
```

where "session_id" is the session ID for the ranging session, "partner_address" is the address of the ranging partner (e.g., AP2 when AP1 is the initiator, or AP1 when AP2 is the initiator), "ranging_status" indicates whether the ranging was successful or unsuccessful, "timestamp_tx" is the timestamp (based on the local system time of the AP or UWB tool within the AP) of transmission of a ranging message to the ranging partner, "timestamp_rx" is the timestamp (based on the local system time of the AP or UWB tool within the AP) of receipt of a ranging message from the ranging partner, "time_reply" is the timestamp (based on the local system time of the AP or UWB tool within the AP) of transmission (if any) or reception (if any) of a ranging reply message to or from the ranging partner, "system_time" indicates a timestamp (based on a global system time across APs) when the ranging report is generated, and "was_initiator" (e.g., Boolean data type) indicates whether the AP is the initiator for the ranging session. Each AP may have access to a time synchronization server (e.g., network time protocol (NTP) server), so that the system clocks of the APs are synchronized to within a threshold accuracy (e.g., within 1 second accuracy). Note that this structure is one example of a ranging report structure and that other ranging report structures may be used.

As indicated at 532, the controller may obtain the ranging report from AP1 via the OOB connection 550 and, as indicated at 542, the controller may obtain the ranging report from AP2 via the OOB connection 560. Upon receiving the ranging reports, the controller may sort and parse the ranging reports. For example, the controller may determine which reports are complimentary or associated with each other (e.g., from the same ranging session and same ranging block within the ranging session), and may determine a distance between two APs based on the complimentary reports. For example, the controller may determine the distance using one or more of the expressions in (1)-(7).

In certain embodiments, because the controller may receive separate ranging reports associated with the same ranging session/ranging block from the initiator and the responder, the controller may be able to determine a more accurate ToF (relative to the ToF from the expressions in (2) or (3)) and, in turn, a more accurate distance measurement using the expression in (1). For example, the more accurate ToF may be a single ToF that relies on round-trip information from both the initiator and responder and that does not use fixed values for the reply times, $t_{reply1}$ and $t_{reply2}$. The controller may determine a more accurate ToF using the following expression in (8):

$$ToF = \frac{(t_{round1} t_{round2}) - (t_{reply1} t_{reply2})}{(t_{round1} + t_{reply1} + t_{round2} + t_{reply2})} \quad (8)$$

where $t_{round1}$ may be calculated using the expression in (4), $t_{reply1}$ may be calculated using the expression in (5), $t_{round2}$ may be calculated using the expression in (6), and $t_{reply2}$ may be calculated using the expression in (7).

In one reference example, assume the controller receives a first ranging report from AP1 and a second ranging report from AP2 where the first and second ranging reports are from the same ranging session and ranging block. In this example, further assume (i) the first ranging report (from AP1) includes, in part, "timestamp_tx"=value1 for a first ranging frame to AP2, "timestamp_rx"=value2 for a second ranging frame from AP2, "time_reply"=value3 for a third ranging frame to AP2, and "was_initiator"=True and (ii) the second ranging report (from AP2) includes, in part, "timestamp_tx"=value4 for the second ranging frame to AP1, "timestamp_rx"=value5 for the first ranging frame from AP1, "time_reply"=value6 for the third ranging frame from AP1, and "was_initiator"=False. From the timestamp information in the first and second ranging reports, the controller may set $T_0$ to value1 and $T_3$ to value2 in the expression in (4), set $T_2$ to value4 and $T_1$ to value5 in the expression in (5), set $T_5$ to value6 and $T_2$ to value4 in the expression in (6), and set $T_4$ to value3 and $T_3$ to value2 in the expression in (7) to determine the ToF using the expression in (8).

In certain embodiments, the "session ID," "partner_address," and "was_initiator" fields may allow the controller to properly identify the ranging reports from both initiators and responders so that the controller can pair the complimentary information. For example, the controller may determine that at least one pair of ranging reports, from a group of ranging reports, are complimentary to each other, when the "session ID" is the same for the pair of ranging reports, the "partner_address" of a first ranging report of the pair of ranging reports indicates the sender of a second ranging report of the pair of ranging reports, the "partner_address" of the second ranging report indicates the sender of the first ranging report, and the "was_initiator" value is different for the pair of ranging reports. In one reference example, the controller may identify a complimentary pair of ranging reports including (i) a first ranging report from AP1 indicating "session ID"=X, "partner_address"=AP2_address, and "was_initiator"=True and (ii) a second ranging report from AP2 indicating "session ID"=X, "partner_address"=AP1_address, and "was_initiator"=False.

Additionally, in certain embodiments, the controller may use a global time stamp (e.g., "system_time") across the initiators and responders to associate ranging reports with their complimentary reports. For example, the controller may use the global time stamp to determine which ranging reports are associated with a same ranging block of a ranging session. Continuing with the above example, the controller may determine the first ranging report from AP1 and the second ranging report from AP2 are complimentary (e.g., associated with a same ranging block) when a difference between the "system_time" from the first ranging report and the "system_time" from the second ranging report is less than a predetermined threshold (or within a predetermined threshold range). Note, due to the potential of failed ranging measurements and offsets in ranging initiation time, the initiator and responder may not generate the same number of reports. Because the controller may associate ranging reports by system time stamp, the ranging bursts may be scheduled with a certain threshold separation in time, such that time ambiguity between initiator and responder is eliminated.

Note that while FIG. 5 depicts different OOB connections 520 and 550 between the controller and AP1, different OOB connections 530 and 560 between the controller and AP2, in certain embodiments, the OOB connections 520 and 550 may be the same OOB connection, and the OOB connections 530 and 560 may be the same OOB connection.

Figure 6:
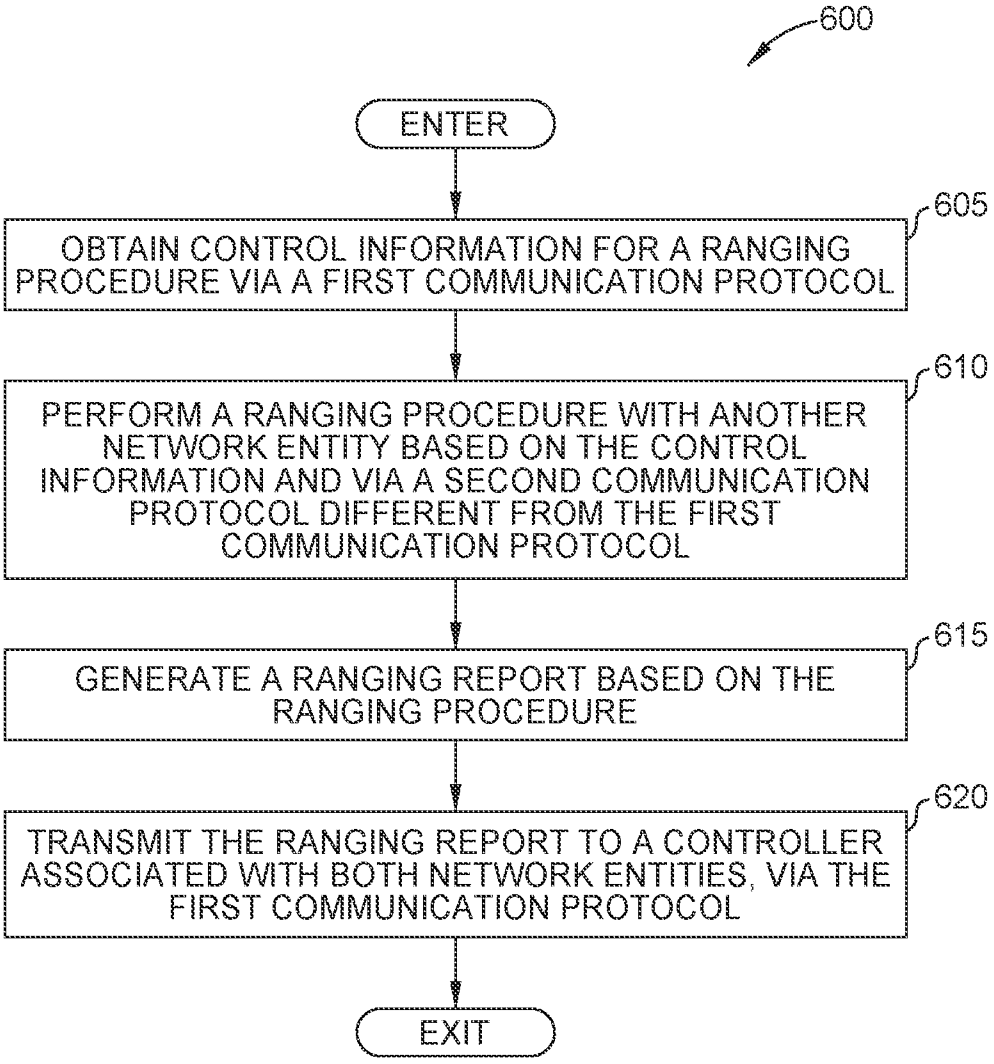
FIG. 6 is a flowchart of a method for performing a ranging procedure, according to one embodiment.

FIG. 6 is a flowchart of a method 600 for performing a ranging procedure, according to one embodiment. The method 600 may be performed by a network entity, such as an AP (e.g., AP1).

Method 600 may enter at block 602, where the network entity obtains control information for a ranging procedure using a first communication protocol. The first communication protocol may be an OOB communication protocol (e.g., 802.11 communication protocol (or WiFi), Bluetooth, Ethernet, cellular, etc.) with respect to UWB. In certain embodiments, the control information may be obtained from a controller (e.g., controller 130) associated with the network entity. In other embodiments, the control information may be obtained from another network entity (e.g., anchor AP). The control information may include a set of ranging parameters for the ranging procedure. For example, the ranging parameters may include one or more session IDs, a list of ranging participants, order of ranging exchanges for the AP, or a combination thereof.

At block 610, the network entity performs a ranging procedure with another network entity (e.g., AP2) based on the control information and using a second communication protocol different from the first communication protocol. The second communication protocol may be a UWB communication protocol. Performing the ranging procedure may involve exchanging solely ranging messages that lack a data portion. For example, each of the ranging messages may have a SP3 frame format.

At 615, the network entity generates a ranging report based on the ranging procedure. The ranging report may include at least one of: (i) a session ID, (ii) an address of the other entity, (iii) a status of the ranging procedure, (iv) a timestamp of transmission of a ranging message, (v) a timestamp of reception of a ranging message, (vi) a timestamp of transmission or reception (if any) of a ranging reply message, (vii) a global system time, or (viii) an indication of whether the network entity was the initiator for the ranging procedure.

At block 620, the network entity may transmit the ranging report to the controller, which is associated with both network entities (e.g., AP1 and AP2). In some cases, the ranging report may be transmitted using the first communication protocol. In other cases, the ranging report may be transmitted using a third communication protocol different from the first communication protocol and second communication protocol. For example, the first communication protocol and the third communication protocol may be a different one of the following: Bluetooth (e.g., BLE), WiFi, Ethernet, and cellular. The second communication protocol may be UWB.

Figure 7:
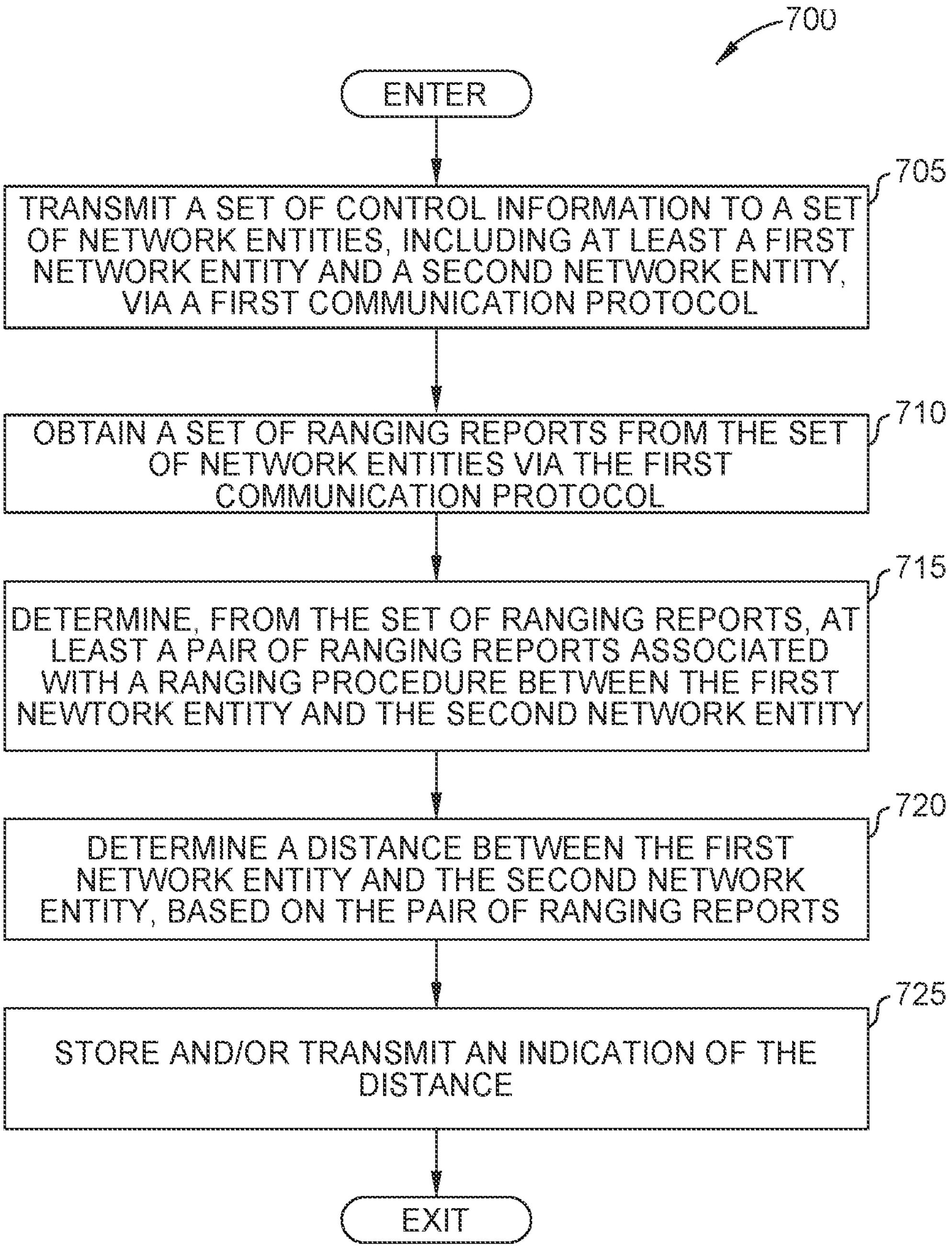
FIG. 7 is a flowchart of a method for managing a ranging procedure, according to one embodiment.

FIG. 7 is a flowchart of a method 700 for managing a ranging procedure, according to one embodiment. The method 700 may be performed by a controller (e.g., controller 130).

Method 700 may enter at block 705, where the controller transmits a set of control information to a set of network entities (e.g., APs, such as AP1 to APN) using a first communication protocol. The set of network entities may include at least a first network entity (e.g., AP1) and a second network entity (e.g., AP2). The first communication protocol may be non-UWB communication protocol (e.g., WiFi, Bluetooth, Ethernet, cellular, etc.). The control information may include a set of ranging parameters for the ranging procedure. For example, the ranging parameters may include one or more session IDs, a list of ranging participants, order of ranging exchanges for the network entity, or a combination thereof.

At block 710, the controller obtains a set of ranging reports from the set of network entities via the first communication protocol. For example, the controller may obtain, from each network entity of the set of network entities, one or more ranging reports associated with one or more ranging procedures conducted using a second communication protocol. The second communication protocol may be a UWB communication protocol.

At block 715, the controller may determine (or identify), from the set of ranging reports, at least a pair of ranging reports associated with a ranging procedure between the first network entity and the second network entity. A first report of the pair of ranging reports may be transmitted from the first network entity, and a second report of the pair of ranging reports may be transmitted from the second network entity. The controller may determine the pair of ranging reports based on information, such as "session ID," "partner address," "was_initiator" and "system_time" within the ranging reports. In one embodiment, the controller may determine which at least two ranging reports, from the set of ranging reports, are within a threshold range of a global system time value and may select the two ranging reports as the pair of ranging reports.

At block 720, the controller may determine a distance between the first network entity and the second network entity, based on the pair of ranging reports. For example, the controller may estimate the distance based on the ToF determined from the timestamp information from the pair of ranging reports (e.g., using one or more of the expressions in (1)-(8)). At block 725, the controller may store an indication of the distance between the first and second network entities (e.g., in a database or other storage system) and/or transmit an indication of the distance (e.g., to the network entities or another computing system). In certain embodiments, the distance information may be used to populate an AP-to-AP distance matrix, which may be used as part of self-locationing functionality of one or more APs.

Figure 8:
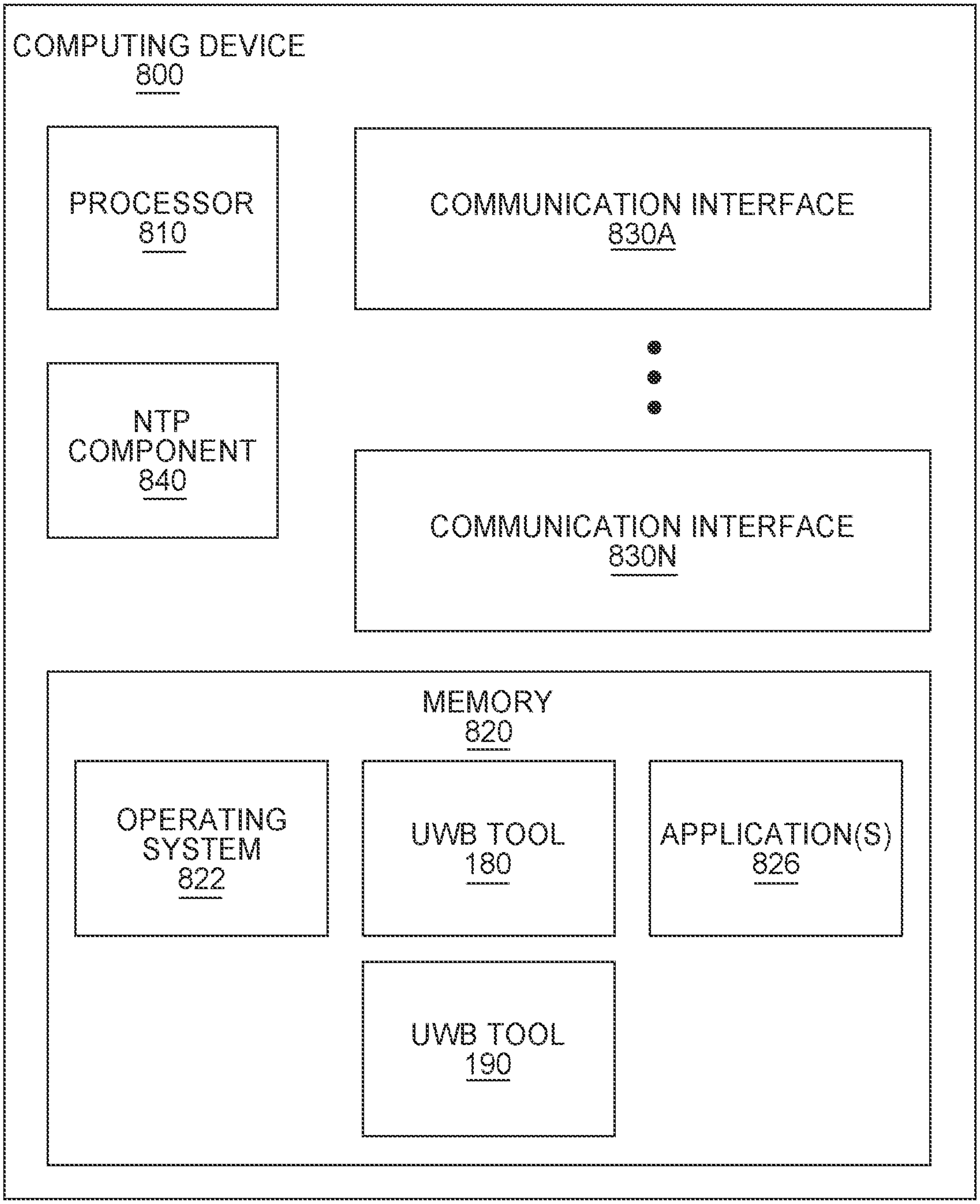
FIG. 8 illustrates an example computing device, according to various embodiments.

FIG. 8 illustrates an example computing device 800, according to one embodiment. The computing device 800 can be configured to perform one or more techniques described herein for extending a range of a ranging procedure using UWB. For example, the computing device 800 can perform method 600, method 700, and any other techniques (or combination of techniques) described herein. The computing device 800 may be representative of a controller (e.g., controller 130) or a network entity (e.g., an AP, such as AP 102). The computing device 800 includes, without limitation, a processor 810, a memory 820, an NTP component 840 (e.g., configured to interact with an NTP server (not shown)), and one or more communication interfaces 830*a-n* (generally, communication interface 830). In one example, the communication interface 830 includes a radio. In certain embodiments, at least one of the communication interfaces includes a UWB radio. Additionally or alternatively, at least one of the communication interfaces may support an OOB communication protocol, such as WiFi, cellular, Bluetooth, Ethernet, etc.

The processor 810 may be any processing element capable of performing the functions described herein. The processor 810 represents a single processor, multiple processors, a processor with multiple cores, and combinations thereof. The communication interfaces 830 (e.g., radios) facilitate communications between the computing device 800 and other devices. The communications interfaces 830 are representative of wireless communications antennas and various wired communication ports.

The memory 820 may be either volatile or non-volatile memory and may include RAM, flash, cache, disk drives, and other computer readable memory storage devices. Although shown as a single entity, the memory 820 may be divided into different memory storage elements such as RAM and one or more hard disk drives. As shown, the memory 820 includes various instructions that are executable by the processor 810 to provide an operating system 822 to manage various functions of the computing device 800. The memory 820 also includes UWB tool 180, UWB tool 190, and one or more application(s) 826.

The computing device 800 may include storage (not shown). In some cases, the storage may be a disk drive or flash storage device. In some cases, the storage may be a combination of fixed and/or removable storage devices, such as fixed disc drives, solid state drives, removable memory cards, optical storage, network attached storage (NAS), or a storage area-network (SAN). The storage may include ToF information, distance information, ranging reports, ranging parameters, or any combination thereof, as illustrative, non-limiting examples.

As used herein, "a processor," "at least one processor," or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refers to a single memory configured to store data and/or instructions or multiple memories configured to collectively store data and/or instructions.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.)

or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:

receiving, by a first network entity, control information for a ranging procedure via a non-ultra-wide band (non-UWB) communication protocol;

performing, by the first network entity, the ranging procedure with a second network entity based on the control information and via an ultra-wide band (UWB) communication protocol, wherein performing the ranging procedure comprises exchanging solely ranging messages with the second network entity;

generating, by the first network entity, a ranging report after performing the ranging procedure, the ranging report comprising a first time-stamped field associated with transmission of a first ranging message to the second network entity; and transmitting, by the first network entity, the ranging report via the non-UWB communication protocol.

2. The computer-implemented method of claim 1, wherein the non-UWB communication protocol comprises an 802.11 communication protocol, a Bluetooth communication protocol, or wired communication protocol.

3. The computer-implemented method of claim 1, wherein the control information is received from a controller associated with the first network entity and the second network entity.

4. The computer-implemented method of claim 1, wherein the control information is received from a third network entity.

5. The computer-implemented method of claim 1, wherein each of the ranging messages lacks a data portion.

6. The computer-implemented method of claim 1, wherein each of the ranging messages has a scrambled timestamp sequence (STS) packet configuration option 3 (SP3) frame format.

7. The computer-implemented method of claim 1, wherein the ranging report is transmitted to a controller associated with the first network entity and the second network entity.

8. The computer-implemented method of claim 1, wherein the ranging report comprises at least one of: (i) a session identifier (ID) associated with the ranging procedure, (ii) a second time-stamped field associated with reception of a second ranging message from the second network entity, (iii) a third time-stamped field associated with transmission of a third ranging message to the second network entity, or (iv) an indication of whether the first network entity was an initiator for the ranging procedure.

9. A first network device comprising:

one or more memories collectively storing instructions; and one or more processors communicatively coupled to the one or more memories, the one or more processors being collectively configured to execute the instructions to cause the first network device to perform an operation comprising:

receiving control information for a ranging procedure via a non-ultra-wide band (non-UWB) communication protocol;

performing the ranging procedure with a second network device based on the control information and using an ultra-wide band (UWB) communication protocol, wherein performing the ranging procedure comprises exchanging solely ranging messages with the second network device;

generating a ranging report after performing the ranging procedure, the ranging report comprising a first time-stamped field associated with transmission of a first ranging message to the second network device; and transmitting the ranging report via the non-UWB communication protocol.

10. The first network device of claim 9, wherein the non-UWB communication protocol comprises an 802.11 communication protocol, a Bluetooth communication protocol, or wired communication protocol.

11. The first network device of claim 9, wherein the control information is received from a controller associated with the first network device and the second network device.

12. The first network device of claim 9, wherein the control information is received from a third network device.

13. The first network device of claim 9, wherein each of the ranging messages lacks a data portion.

14. The first network device of claim 9, wherein each of the ranging messages has a scrambled timestamp sequence (STS) packet configuration option 3 (SP3) frame format.

15. The first network device of claim 9, wherein the ranging report is transmitted to a controller associated with the first network device and the second network device.

16. The first network device of claim 10, wherein the ranging report comprises at least one of: (i) a session identifier (ID) associated with the ranging procedure, (ii) a second time-stamped field associated with reception of a second ranging message from the second network device, (iii) a third time-stamped field associated with transmission of a third ranging message to the second network device, or (iv) an indication of whether the first network device was an initiator for the ranging procedure.

17. A computer-implemented method comprising:

generating control information for a ranging procedure between a first network entity and a second network entity;

transmitting the control information to the first network entity and the second network entity via a non-ultra-wide band (non-UWB) communication protocol, the control information configuring the first network entity and the second network entity to carry out the ranging procedure and to generate ranging reports based on the ranging procedure;

receiving, via a non-UWB communication protocol, a first ranging report associated with the ranging procedure from the first network entity and a second ranging report associated with the ranging procedure from the second network entity; and determining a distance between the first network entity and the second network entity based on the first and second ranging reports.

18. The computer-implemented method of claim 17, wherein the ranging procedure is a UWB-based ranging procedure.

* * * * *